United States Patent [19]

Bonnaval-Lamothe

[11] Patent Number: 4,817,170
[45] Date of Patent: Mar. 28, 1989

[54] PROCESS AND DEVICE FOR THE TRANSMISSION OF CODED INFORMATION

[76] Inventor: Michel Bonnaval-Lamothe, "Cote Belle", 33410 Cadillac Sur Garonne, France

[21] Appl. No.: 824,085

[22] Filed: Jan. 30, 1986

[30] Foreign Application Priority Data

Jan. 30, 1985 [FR] France ............................. 85 01394

[51] Int. Cl.[4] ............................................. G06K 9/00
[52] U.S. Cl. ..................................... 382/11; 235/463; 382/64
[58] Field of Search ...................... 382/11, 12, 24, 64, 382/65, 66; 235/456, 463

[56] References Cited

U.S. PATENT DOCUMENTS

| | | | |
|---|---|---|---|
| Re. 31,692 | 10/1984 | Tyburski et al. | 382/64 |
| 3,588,457 | 6/1971 | Bijleveld et al. | 382/11 |
| 3,833,882 | 9/1974 | Busby | 382/11 |
| 3,903,503 | 9/1975 | Dillingham et al. | 382/11 |
| 4,125,765 | 11/1978 | Cowardin et al. | 235/463 |
| 4,159,471 | 6/1979 | Whitaker | 382/24 |
| 4,286,146 | 8/1981 | Uno et al. | 382/11 |
| 4,403,339 | 9/1983 | Wevelsiep et al. | 235/463 |
| 4,567,361 | 1/1986 | Rosenthal | 235/463 |

FOREIGN PATENT DOCUMENTS

WO80/02758 12/1980 World Int. Prop. O. .

OTHER PUBLICATIONS

Nielson, M. C., "Word Processing Bar Code", IBM Technical Disclosure Bulletin, vol. 26, No. 1, Jun. 1983.

*Primary Examiner*—Leo H. Boudreau
*Attorney, Agent, or Firm*—Robert J. Koch

[57] ABSTRACT

A process and apparatus for transmission of coded information that permits information to be applied on or integrated into, any data carrier, so as to incorporate its clock cycle or reading clock. The invention offers a thoroughly reliable system having simple and low cost embodiments as far as the coding means are concerned, by the use of characters or signs of general utilization such as the characters of an alphabet. A process of transmission of coded information, characterized by utilizing any suitable device to apply or incorporate a sequence of m packs of positions of characters of signs into a data carrier.

14 Claims, 4 Drawing Sheets

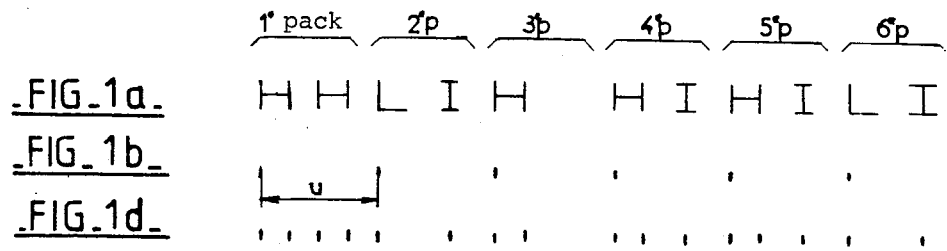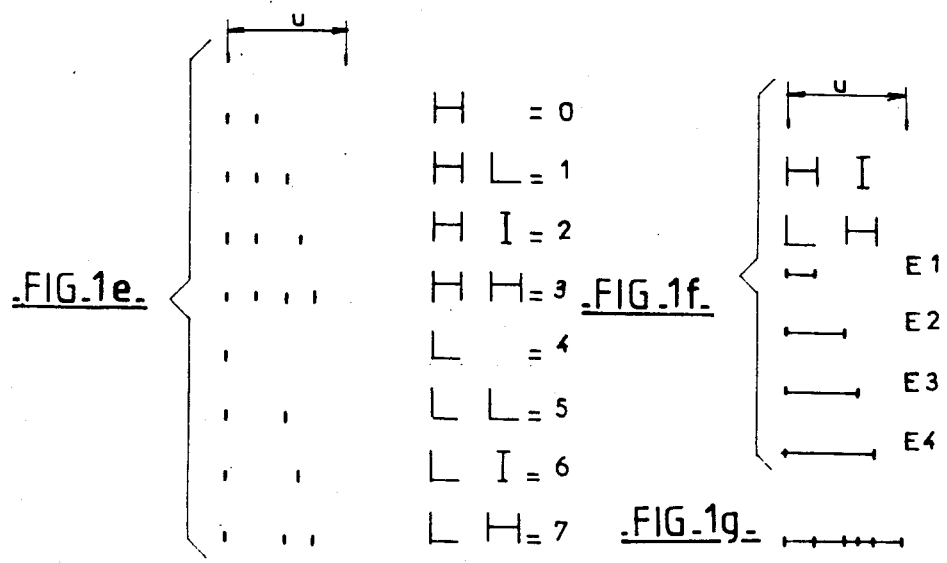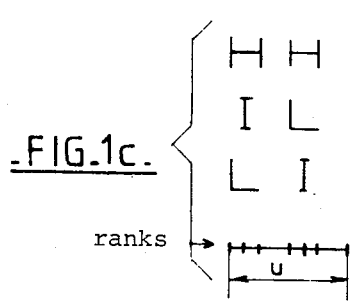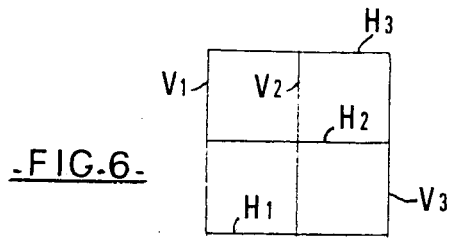

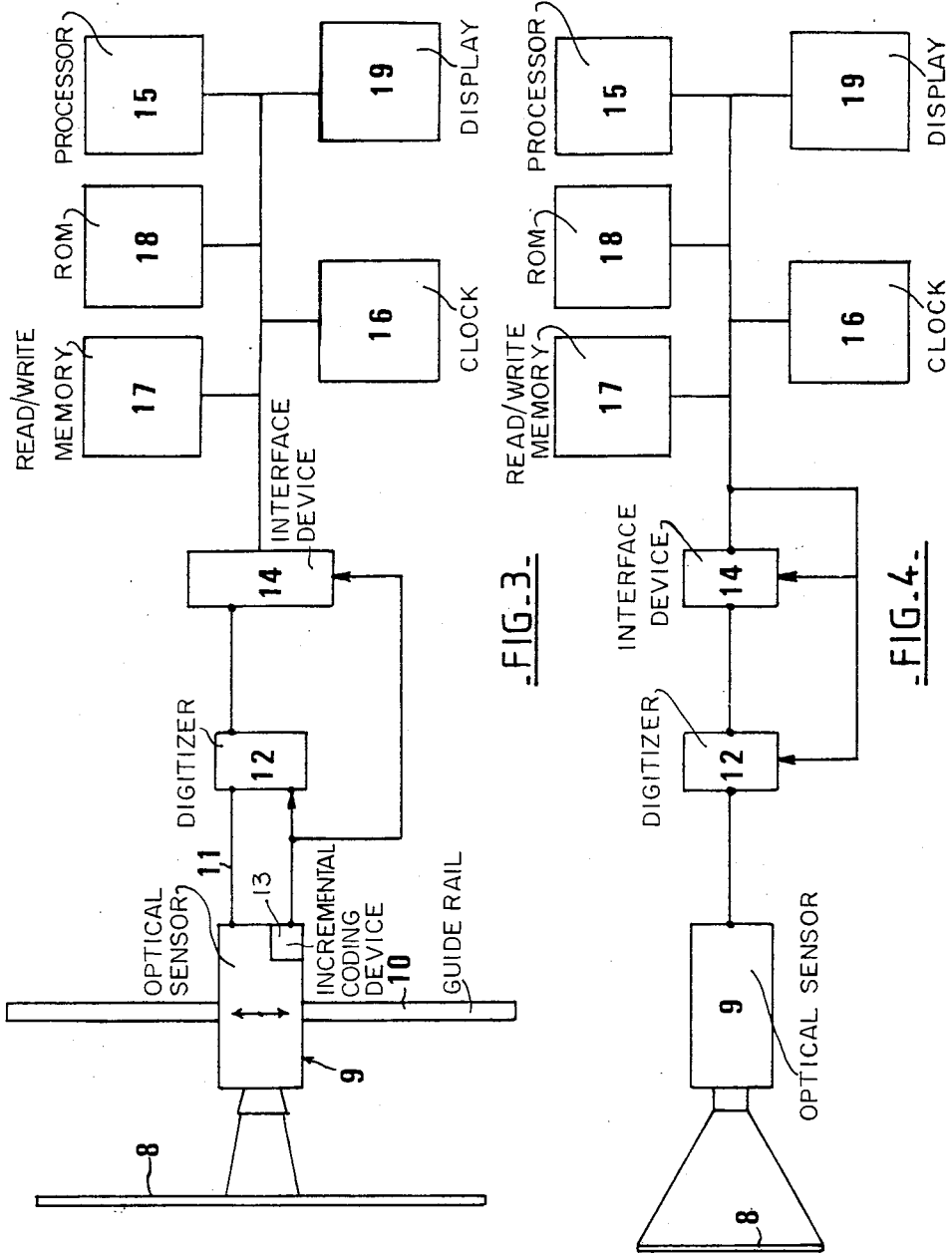

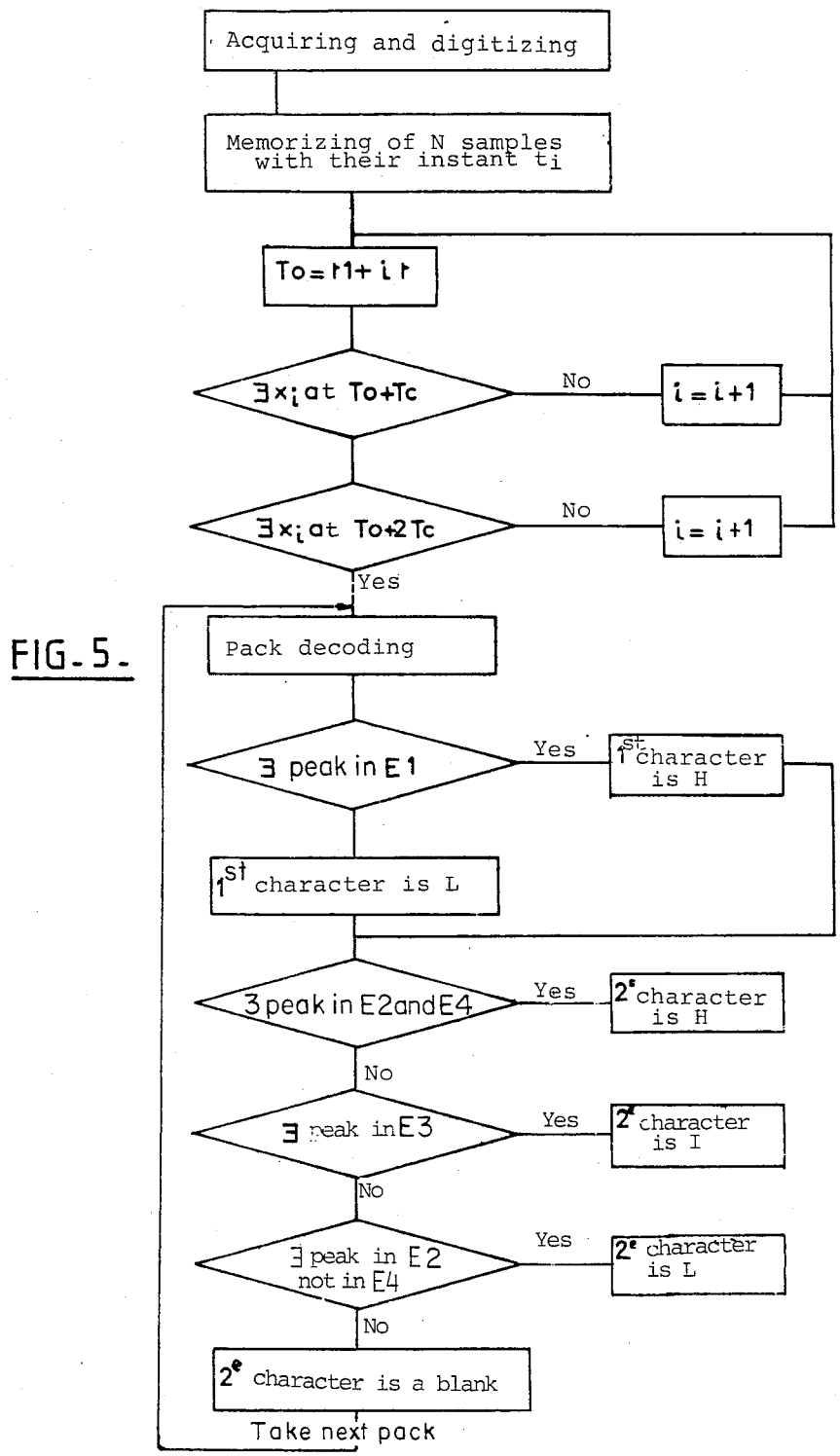

PROCESS AND DEVICE FOR THE TRANSMISSION OF CODED INFORMATION

FIELD OF THE INVENTION

This invention relates to a new process for the transmission of coded information, and, more specifically, to a process that permits a coded information to be applied on or integrated into any data carrier, in order to incorporate its clock cycle or reading clock.

SUMMARY OF THE INVENTION

The purpose of the invention is to offer a thoroughly reliable system of transmission of coded information capable of simple and low cost embodiment as far as the coding means are concerned, in particular by the use of characters or signs of general utilization such as, for instance, the characters of an alphabet.

Therefore the object of the invention is a process of transmission of coded information, characterized by the fact that it consists, on the one hand, by any suitable mean to apply in or to incorporate into any data carrier a sequence of m packs of positions of characters or signs, said characters or signs being grouped one after another and having the same extension and the same number n of positions filled fully or in part by one of p predetermined characters or signs, each being identifiable by means of one or more significant items, each combination of these p characters or signs of any pack being related to a numeral, a letter or sign or a group of any letters or signs according to a predetermined coding rule, said coding rule providing that, for whatever pack the position of rank q is filled by a character or sign including a significant item having always the same position within said pack, the uniform succession in said sequence of said significant items of $q^{th}$ rank thus defining a clock rate designated as a coded clock, while the significant items of the other ranks represent the informative content of said sequence, and on the other hand, to restore the information coded within said sequence by reading the sequence from the beginning to the end in order to detect and to position in time all significant items of all characters or signs by the comparison of a time reference designated as reference clock that corresponds to said coded clock with the succession of significant items being read in an iterative process until the coincidence between the coded and reference clocks is found, then by decoding said significant content of the sequence whose successive packs are thus strictly phased in the time scale defined by the reference clock.

The p characters are preferably selected among the letters of an alphabet and more particularly those letters capable of being particularized from a significant item easily identified by the reading system and that can be found in each of p letters selected.

Within each pack of the sequence the significant items of the individual letters are capable of filling positions arranged at regular intervals and characterized by their rank.

The coded clock can be phased on the significant items of the first rank, that is those found in the first place in each pack, in which case of course the significant item must be in the first rank of each pack of the sequence, but the coded clock can also be phased on significant items of a different rank.

BRIEF DESCRIPTION OF THE DRAWINGS

In order to better clarify the process of the invention, a method of embodiment is described hereafter with reference to the appended drawings where:

FIG. 1a shows an example of the coding according to the invention,

FIG. 1b shows the time scale defined by the coded clock integrated to the code of FIG. 1a, FIG. 1c shows the possible positions within one pack of the
code letters selected
FIG. 1d shows the reading signals of the code of FIG. 1a FIG. 1e shows the coding method for the numerals 0 through 7 by means of the system illustrated in FIG. 1a FIG. 1f shows the four types of deviations between significant items in the system shown in FIG. 1a FIG. 1g shows the positioning in time of the possible significant items within one time unit of the coded clock
FIG. 4 shows an alternative embodiment of the device of FIG. 3

FIG. 5 shows a flowchart of the digital processing of reading signals in order to establish the coincidence between the coded clock and the reference clock, and FIG. 6 shows a type of sign that can be utilized in the process of the invention.

DETAILED DESCRIPTION OF THE PREFERRED EMBODIMENTS

Figure 2A:
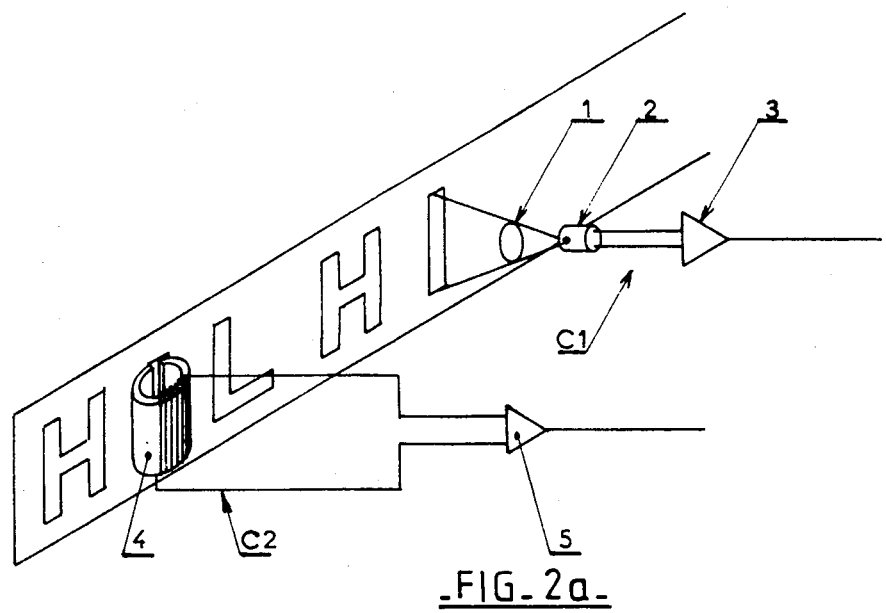
FIG. 2a through 2c show several modes of reading a coded
information of the type shown in FIG. 1a FIG. 3 is the diagramme of a method of embodiment of the reading system capable of processing information according to the invention

In the example of FIG. 1a, a sequence of six successive packs is shown, with each two positions available for either a blank space or for any of the letters selected from a group comprising the three upper-case letters H, I, L of the latine alphabet.

Some groups (Groups No 1, 2, 4, 5, 6) contain two letters, others (Group No 3) contain one letter only.

These letters were selected because they can be easily identified in the reading by a significant item made of a vertical bar that can be found in all three letters H, I and L.

The coded information of FIG. 1 a integrates its own reading or coded clock illustrated in FIG. 1a by a sequence of pips that are distributed uniformously along the coded sequence and phased on the significant items of rank No 1 of each pack. In fact, from FIG. 1a, it can be seen that the first letter position of each pack is filled by a letter (H or L) comprising a significant item (vertical bar) at rank No 1.

Within the time unit u of the coded clock of FIG. 1b, on account of the letters selected and of the fact that each pack has two different positions available for letters, FIG. 1c shows the possible positions or ranks of the significant items of the various combinations of letters. It can be seen that there are six ranks for the significant items, those of the letter I being at rank No 2 and rank No 5.

Since in this case the coded clock was (arbitrarily) phased with rank No 1, each pack must have either a H or a L at its first letter position. Should the clock be phased with rank No 2, each pack would comprise a I at the first letter position, the second position having either H, I, L or a blank space.

FIG. 1d shows the reading pips of all the significant items of the coded information of FIG. 1a.

FIG. 1e shows a coding mode for the numerals 0 through 7, said mode being selected among many others equally feasible; this coding mode involves the combination of H or L with one of the three letts H, I, L or a blank space, said coding being applicable to the case of the coded clock phased with first rank significant items as shown in FIGS. 1a and 1b.

FIG. 1f shows the four different spacings E 1 through E 4 between significant items that may be read in a pack and that permit to discriminate H, I and L in time along the reading scale (FIG. 1d) of the coded information of FIG. 1.

Under the process of the invention, the reading operation is carried out as follows:

Within the reading system a reference clock is generated to define a time scale whose unit is equal to the unit u of the coded clock. The coded information of FIG. 1a is carried by any data carrier and the first letters of each pack are spatially distributed at regular intervals, as the case is if said letters are typed or printed for instance. Therefore the coded clock is constant.

So that the coded clock can be read properly, the reading speed must be constant and defined. Otherwise it would be sufficient to know the speed or the speed variation law to be able to amend the reading in order to restore a coded clock that corresponds to the reference clock.

This is feasible by example by providing an incremental coding device in an analog information reading system coded as shown in FIG. 1a.

FIG. 2a shows two examples of reading devices that generate an analog signal whenever a significant item passes in front of a detecting device.

FIG. 2a shows at C1 a punctual optical sensor capable of reading the presence of a vertical bar by the difference in light between the bar and the adjacent space. Each vertical bar coming into the field of the sensor C1 is projected by a suitable optical system 1 in form of a point onto a photodetector 2 that generates an analog signal through an amplifier 3. When horizontal bars pass in front of the photodetector 2, the light signal issued is lower than the activation threshhold so that only the vertical bars or significant items of the information read are accepted.

C2 is the diagrammatic representation of a magnetic sensor symbolized by an open core magnetic coil 4 with a vertical air gap in correspondence with the vertical bars of the coded information, and of course the letters of said information are written with a magnetic ink.

The coil 4 is linked with an amplifier 5 that generates an analog signal.

Figure 2B:
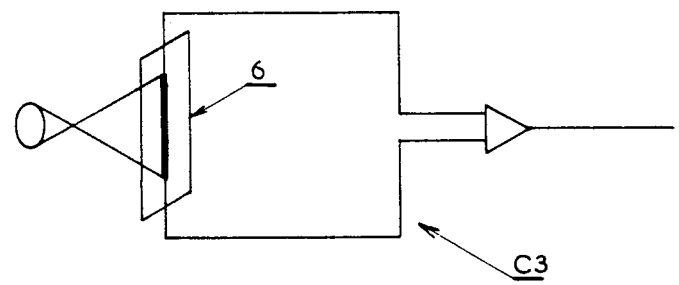
Figure 2C:
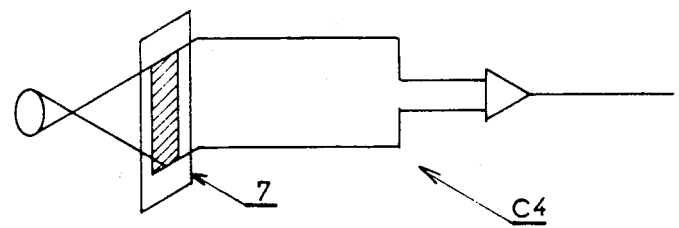

FIG. 2b and 2c are alternative versions of the optical sensor C1. Sensor C3 in FIG. 2b is a linear sensor, the image on the light-sensible cell 6 being a vertical line in correspondence with the vertical bar in front of the sensor. Sensor C4 in FIG. 2c is a bi-dimensional sensor, with the image of the light-sensitive cell 7 being a rectangle in correspondence with the vertical bar in front of the sensor.

FIG. 3 shows the general arrangement of a method of embodiment of a reading system appropriate for the processing of the coded information according to the invention.

More specifically, FIG. 3 is an illustration of the case where a message coded as provided by the invention and symbolized by 8 is being read in progressive scanning process by mutual movement between the message 8 carried by any data carrier and an optical sensor that may be a camera 9 for instance.

In the example of FIG. 3 the moving element is the camera that travels in a parallel direction to the message 8 along a guide rail shown at 10, but it is understood that the arrangement could be in the opposite way, with the camera 9 fixed and the message 8 being transported past it.

During the travel of the camera 9 along the rail 10, that is achieved by conventional and not represented means, the camera 9 issues reading signals of the message 8 to a digitizing unit 12, over a connection 11. On the other hand, the camera 9 is provided with an incremental coding device 13 that constitutes a reading clock permitting the correct reading of the coded clock carried by the message 8 regardless of the relative travelling speed of the camera 9 with respect with said message.

Therefore the coding device 13 issues clock signals to the digitizing unit 12 as well as to an interface device 14, inserted between the digitizing unit 12 and the data processing and display unit.

This data processing and display unit includes an intelligent unit such as a micro-processor 15, an internal clock 16, a read-write memory 17, a read-only memory 18 and a display console 19 provided with a decoding device in order to turn the message as read into uncoded form.

FIG. 4 shows an alternative embodiment for the case when there is no relative motion between the camera 9 and the message 8, the message 8 being fully within the camera field.

In this alternative embodiment, no incremental coding device is required, as the reading rate of the message is generated by the system (15,16) and is applied to devices 12,14 to properly sample the signals issued by the camera 9.

Note that when there is a relative motion between the camera 9 and the message 8 and when the reading rate is known and perfectly constant, the coding device 13 is no longer necessary, as the system (15,16) that controls the reading clock ensures the correct sampling of signals from the camera.

FIG. 5 shows the flowchart of the logic processing under the control of the intelligent unit 15, of the reading system described in FIG. 3, of the digital signals generated by the digitizing unit 12 that corresponds, by way of example, to the information reading sequence of FIG. 1a, illustrated by FIG. 1d.

In the description of FIG. 3 it has been shown that the reading system includes a reading clock that permits to sample the reading signals of FIG. 1d, that is to define the spacings E1 to E4 and therefore to discriminate letters H, I, L and blank spaces.

The processing of said reading signals lies in having the reference clock stored in the reading system "to slide" along the time axis as defined by the reading clock and in the iterative comparison of the reference clock with the succession of the reading signals until a coincidence is found between each pip and a reading pip or peak, such a coincidence being shown in both FIG. 1b, 1d. This coincidence is the decoding key and is the one possible key as can be ascertained by looking at both FIG. 1b, 1d. In fact, if the first pip of the scale in FIG. 1b is shifted to have it coincide witht the second, the third or the fourth pip of the reading scale of FIG. 1d, it will be readily seen that, for the other pips of FIG. 1b, there is no systematic coincidence of a pip with FIG. 1d. Of course, in the simple implementation of FIG. 1a, there are no iterative coincidence tests to be made when the coincidence is originallly established between the first pip of the reference clock and the first reading signal and is ipso facto achieved, but the position is different when the significant item of the coded clock is not at the first rank in each pack.

Once a coincidence is found between the coded clock and the reference clock, the content of the successive packs of the sequence is scanned and decoded by the determination of said spaces E1 to E4 (FIG. 1f) and then the decoded information is displayed in uncoded form at 19.

The above-described operations are illustrated as a program in FIG. 4

Under said programme, N samples (reading pips) are acquired, digitized and memorized with their times ti, along the time scale provided by the reading clock. After the memorization, packs are being retrieved, and the coded clock Tc of packs is known. The pack decoding loop ensures the retrieval of a convergence for x packs and permits to know the nature of the first and of the second character in each pack.

In the example described with reference to FIG. 1a, each pack contains two letters or letter positions, but a pack can contain one letter or position, or, by contrast, more than two. The letters H, I and L are easy to be identified and characterized by means of a significant item consisting in a vertical bar, but other letters of the latine alphabet may be selected on the basis of one or more different significant items. Letters from a different alphabet and, more generally speaking, any sign, conventional or not conventional, may be taken, provided they all have at least one common significant item capable of being identifed in a simple, reliable and fully unequivocal manner.

Therefore it is possible to use—while remaining in the scope of the invention- a sign consisting of a character of an alphabet or otherwise, that contains several vertical bars that form several significant items whose information content varies according to their position within the sign. Said sign may also contain one or more horizontal bars which represent other significant items which also vary in information content depending on their position within the sign. FIG. 6 shows such a sign that consists of a square divided into four smaller squares.

In said sign, there are three vertical bars V1, V2, V3, from left to right, and three horizontal bars H1, H2, H3.

Supposing that this sign is used in a sequence of packs having one sign each, the coded clock will be phased with the vertical signiificant item (the so-called significant clock item) of first (V1), second (V2) or third (V3) rank, or else with one of the horizontal significant items of first, second or third rank (H1, H2, H3), with the other significant items (as many as five in a sign as in FIG. 6) carrying the coded information. Note that only the position of vertical or horizontal bars in the sign is significant, not their extension, that may vary, as for instance in the letter F.

With a sequence of packs consisting of one sign, the requirement is that all the signs used have a significant clock item with the same spatial position, signs differing from each other by the number and the spatial position of the other significant items in charge of conveying the information content.

By this method it is possible to convey a much larger volume of information with a limited number of signs in the useful sequence.

The use of signs taken from an alphabet in common use has the outstanding advantage of permitting a simple and low-cost method of application of the coded information onto the carrier, as it can be done in printing or in typewriting, provided the optical reading sensor used works along the principle of light difference between the printed characters and the background carrier.

What is claimed is:

1. A method of reading and decoding information comprising the steps of:
    reading a sequence of m packs of n positions filled in part by at least one of p characters, each pack exhibiting at least one significant item in at least one of a predetermined number of ranks, wherein each pack exhibits a significant item in a predetermined rank q;
    defining a coded clock rate by sensing a uniform succession of significant items in said predetermined rank q of each pack;
    detecting all significant items in said sequence;
    comparing a reference clock, corresponding to said coded clock, to a succession of said significant items in said rank q in an iterative process until said reference clock and said coded clock coincide;
    decoding said significant items of said sequence according to a predetermined code.

2. A method as in claim 1, wherein each of said p characters in an alphanumeric character exhibiting a significant item in at least one of said ranks.

3. A method according to claim 2, wherein said ranks are arranged at regular intervals and each character is characterized by significant items corresponding to said ranks.

4. A method as in claim 3, wherein said significant items are vertical bars.

5. A method as in claim 2, wherein said significant items are horizontal bars.

6. A method as in claim 1, wherein each pack has at least two positions; said positions exhibit preselected characters and blanks.

7. A method as in claim 1, wherein the number of positions n is one, each position exhibiting one character of a preselected group of characters each exhibiting a significant item in a predetermined rank and uniquely identifiable by the presence or absence of at least one additional significant item.

8. An apparatus for reading and decoding information comprising:
    means for reading a sequence of m packs of n positions filled in part by at least one of p characters, each exhibiting at least one of a predetermined number of ranks, wherein each pack exhibits a significant items in a predetermined rank q;
    means for defining a coded clock rate by sensing a uniform succession of significant items in said predetermined rank q of each pack responsive to said means for reading;
    means for detecting all significant items in said sequence responsive to said means for reading;
    means for comparing a reference clock, corresponding to said coded clock, in an iterative process until said reference clock and said coded clock coincide responsive to said means for detecting and means for comparing;

means for decoding said significant items of said sequence according to predetermined code associated with said means for comparing and said means for reading.

9. An apparatus as in claim 8, wherein each of said p characters is an alphanumeric character exhibiting a significant item in at least one of said ranks.

10. An apparatus according to claim 9, wherein said ranks are arranged at regular intervals and each character is characterized by significant items corresponding to said ranks.

11. An apparatus as in claim 10, wherein said significant items are vertical bars.

12. An apparatus as in claim 10, wherein said significant items are horizontal bars.

13. An apparatus as in claim 8, wherein each pack has at least two positions; said positions exhibit preselected characters and blanks.

14. An apparatus as in claim 8, wherein the number of positions n is one, each position exhibiting one character of a preselected group of characters each exhibiting a significant item in a predetermined rank and uniquely identifiable by the presence or absence of at least one additional significant item.

* * * * *